United States Patent [19]
Combs et al.

[11] Patent Number: 5,365,512
[45] Date of Patent: Nov. 15, 1994

[54] MULTISITE TRUNKED RF COMMUNICATION SYSTEM WITH RELIABLE CONTROL MESSAGING NETWORK

[75] Inventors: Edward A. Combs, Lynchburg; Dennis M. Maddox, Rustburg; Wim A. Imron, Forest, all of Va.

[73] Assignee: Ericsson GE Mobile Communications Inc., Lynchburg, Va.

[21] Appl. No.: 84,944

[22] Filed: Jul. 2, 1993

[51] Int. Cl.$^5$ .......................... H04J 3/14; G06F 11/20
[52] U.S. Cl. ..................................... 370/16; 370/58.1; 370/85.11; 371/8.2; 340/825.01; 340/825.08; 455/53.1
[58] Field of Search ............... 370/58.1, 58.3, 66, 370/67, 68.1, 53, 85.1, 85.7, 85.8, 85.9, 85.11, 95.1, 95.2, 95.3, 13, 16, 16.1; 371/8.1, 8.2, 11.1, 11.2, 48; 340/825.01, 825.03, 827, 825.08, 825.16; 379/58, 221, 16; 455/8, 53.1, 54.1

[56] References Cited

U.S. PATENT DOCUMENTS

| | | | |
|---|---|---|---|
| 4,365,248 | 12/1982 | Bargeton et al. | 340/825.01 |
| 4,402,082 | 8/1983 | Cope | 371/22 |
| 4,532,625 | 7/1985 | Stover | 370/58.1 |
| 4,603,418 | 7/1986 | Townsend | 370/85.1 |
| 4,605,928 | 8/1986 | Georgiou | 340/825.94 |
| 4,658,396 | 4/1987 | Barden | 370/16 |
| 4,680,753 | 7/1987 | Fulton et al. | 370/85.1 |
| 4,747,097 | 5/1988 | Ohya et al. | 370/88 |
| 4,847,837 | 7/1989 | Morales et al. | 370/16 |
| 4,875,037 | 10/1989 | Escolar | 340/825.01 |
| 4,945,355 | 7/1990 | Blanchette | 340/825.06 |
| 4,959,829 | 9/1990 | Griesing | 370/85.11 |
| 4,964,120 | 10/1990 | Mostashari | 370/16 |
| 5,003,531 | 3/1991 | Farinholt et al. | 370/16.1 |
| 5,016,243 | 5/1991 | Fite, Jr. | 370/16 |
| 5,016,244 | 5/1991 | Massey, Jr. et al. | 370/16 |
| 5,072,442 | 12/1991 | Todd | 370/62 |
| 5,107,257 | 4/1992 | Fukuda | 340/825.08 |
| 5,109,296 | 4/1992 | Fukushima et al. | 359/174 |
| 5,200,949 | 4/1993 | Kobayashi | 370/16 |
| 5,253,253 | 9/1993 | Brame et al. | 370/85.11 |

*Primary Examiner*—Douglas W. Olms
*Assistant Examiner*—Hassan Kizou
*Attorney, Agent, or Firm*—Nixon & Vanderhye

[57] ABSTRACT

A distributed switching network (switch) routes audio and control signals throughout the switch from various audio sources to one or more audio destinations. Audio sources such as mobile/portable radio units (via RF repeater transmitters), dispatch consoles, and landline telephone subscribers (via the central telephone switching network) are preassigned and routed onto an audio channel (i.e. a time slot) on a time division multiplexed (TDM) audio bus through a corresponding node. Each microprocessor controlled node is connected to plural control message buses provided for transferring control messages between nodes. A first supervisory node is physically connected at one end of the message buses and an end node is connected at the other end. If the end node fails to respond to a polling message from the supervisory node within a predetermined time period, the supervisory node assumes that the current messaging bus is faulty and initiates a bus switching operation to an alternate messaging bus. The supervisory and end nodes thereafter coordinate switching of all nodes in the switch to the alternate control messaging bus to insure reliable trunked RF communications over the multisite network.

15 Claims, 10 Drawing Sheets

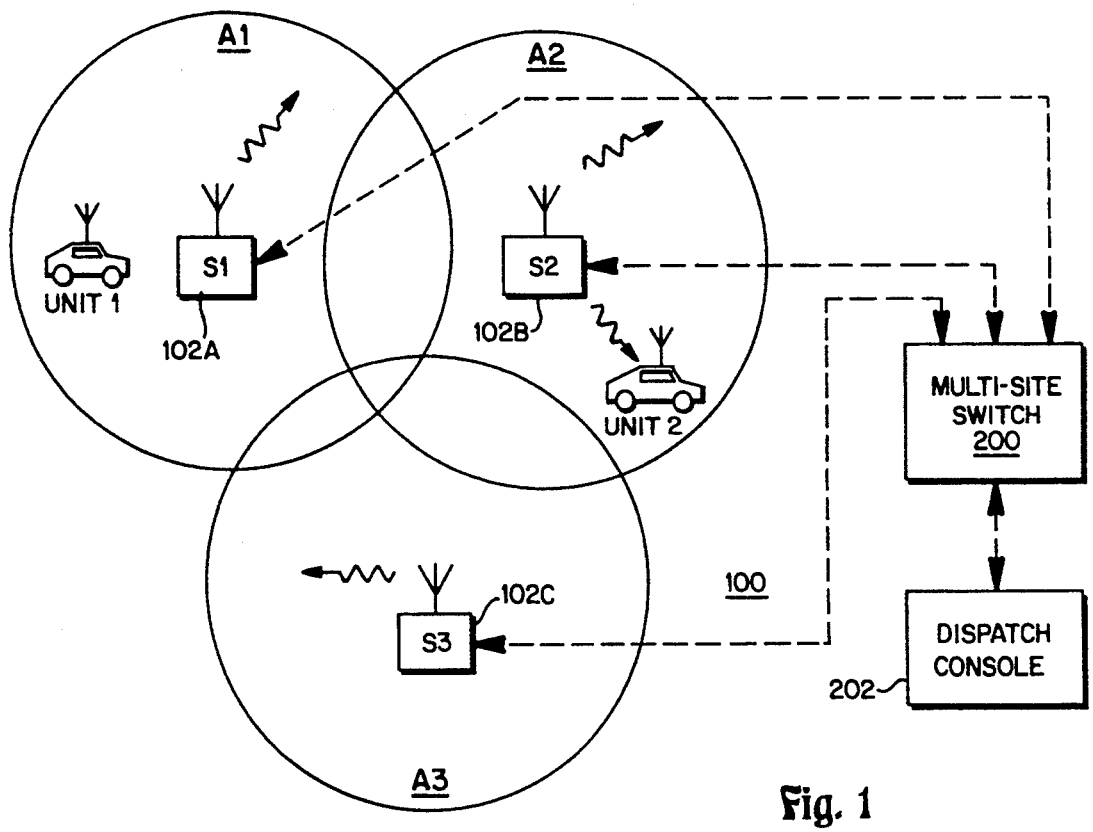
Fig. 1
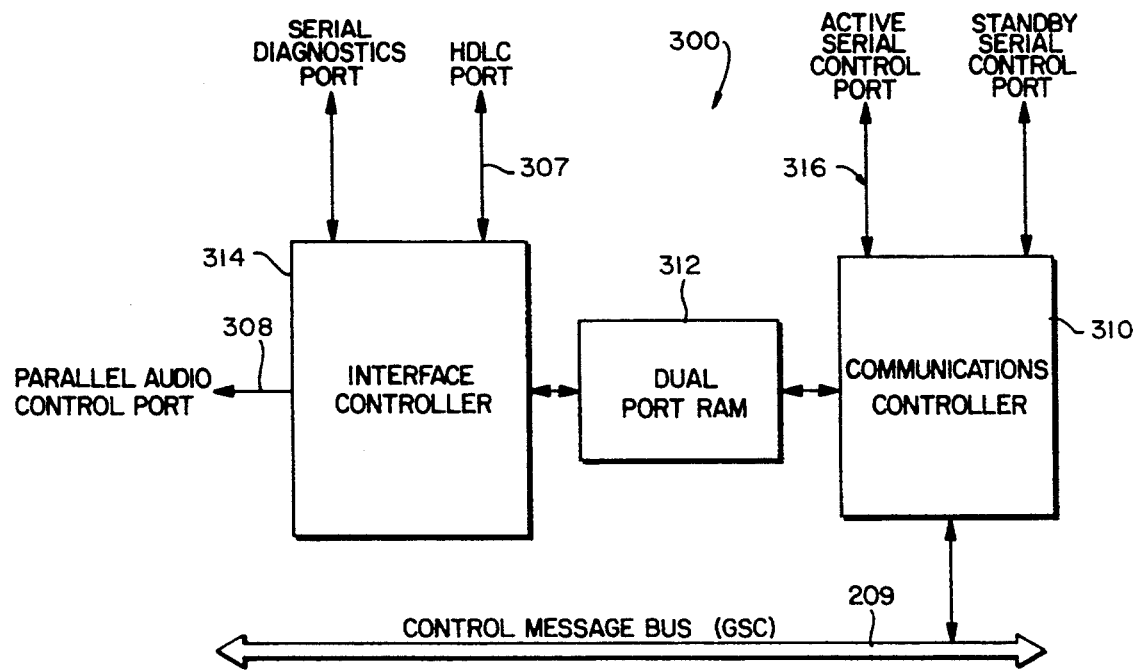
Fig. 4 SWITCH CONTROLLER CARD ARCHITECTURE

Fig. 2 MULTI-SITE ARCHITECTURE

MULTISITE TRUNKED RF COMMUNICATION SYSTEM WITH RELIABLE CONTROL MESSAGING NETWORK

FIELD OF THE INVENTION

The present invention relates to a multisite switch which coordinates trunked radio frequency (RF) communications between multiple sites with a high level of reliability, and more particularly, to such a system which provides plural control message buses to insure redundant and reliable switch operation.

BACKGROUND AND SUMMARY OF THE INVENTION

Trunked RF repeater systems have become a mainstay of modern RF communications systems, and are used, for example, by public service organizations (e.g., governmental entities such as counties, fire departments, police departments, etc.). Such RF repeater systems permit a relatively limited number of RF communications channels to be shared by a large number of users—while providing relative privacy to any particular RF communication (conversation). Typical state-of-the-art RF repeater systems are "digitally trunked" and use digital signals conveyed over the RF channels (in conjunction with digital control elements connected in the system) to accomplish "trunking" (time-sharing) of the limited number of RF channels among a large number of users.

Briefly, such digitally trunked RF communications systems include a "control" RF channel and multiple "working" RF channels. The working channels are used to carry actual communications traffic (e.g., analog FM, digitized voice, digital data, etc.). The RF control channel is used to carry digital control signals between the repeater sites and user RF transceivers (radio units) in the field. When a user's transceiver is not actively engaged in a conversation, it monitors the control channel for "outbound" digital control messages directed to it. User depression of a push-to-talk (PTT) switch results in a digital channel request message requesting a working channel (and specifying one or a group of callees) to be transmitted "inbound" over the RF control channel to the repeater site. The repeater site (and associated trunking system) receives and processes the channel request message.

Assuming a working channel is available, the repeater site generates and transmits a responsive "outbound" channel assignment digital message over the RF control channel. This message temporarily assigns the available working channel for use by the requesting transceiver and other callee transceivers specified by the channel request message. The channel assignment message automatically directs the requesting (calling) transceiver and callee transceivers to the available RF working channel for a communications exchange.

When the communication terminates, the transceivers "release" the temporarily assigned working channel and return to monitoring the RF control channel. The working channel is thus available for reassignment to the same or different user transceivers via further messages conveyed over the RF control channel. An exemplary "single site" trunked RF repeater system is disclosed in the commonly-assigned U.S. Pat. Nos. 4,905,302 and 4,903,321.

Single site trunked RF repeater systems may have an effective coverage area of tens of square miles. It is possible to provide one or more satellite receiving stations (and a single high power transmitting site) if a somewhat larger coverage area is desired. However, some governmental entities and other public service trunking system users may require an RF communications coverage area of hundreds of square miles. In order to provide such very large coverage areas it is necessary to provide multiple RF repeater sites and to automatically coordinate all sites so that a radio transceiver located anywhere in the system coverage area may efficiently communicate in a trunked manner with other radio transceivers located anywhere in the system coverage area.

FIG. 1 is a schematic diagram of a simplified exemplary multiple-site trunked radio repeater system having three radio repeater (transmitting/receiving) sites S1, S2, and S3 providing communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. Each repeater site S1, S2, S3 includes a set of repeating transceivers operating on a control channel and plural RF working channels. Each site may typically have a central site controller (e.g., a digital computer) that acts as a central point for communications in the site, and is capable of functioning relatively autonomously if all participants of a call are located within its associated coverage area.

To enable communications from one area to another, however, a switching network referred to herein as a "multisite switch", must be provided to establish control and audio signal pathways between repeaters of different sites. Moreover, such pathways must be set up at the beginning of each call and taken down at the end of each call. For example, the site controller (S1) receives a call from a mobile radio in A1 requesting a channel to communicate with a specific callee. A caller requests a channel simply by pressing the push-to-talk (PTT) button on his microphone. This informs the site controller S1 via an "inbound" digital control message transmitted over the RF control channel that a working or audio channel is requested. The site controller assigns a channel to the call and instructs the caller's radio unit to switch from the control channel to the audio channel assigned to the call. This assigned channel is applicable only within the area covered by the site.

In addition, the site controller sends the channel assignment to the multisite switch 200 which assigns an internal audio slot to the call. The switch 200 also sends a channel request over a control messaging bus to other site controllers having a designated callee within their site area. Audio signals are routed such that audio pathways are created to serve the callee(s) and one or more dispatcher consoles 202 involved in the communication. Upon receiving a channel request, these "secondary" site controllers (in the sense they did not originate the call) assign an RF working channel to the call. Each secondary channel is operative only in the area covered by the secondary site controller. The secondary site controller(s) also sends the channel assignment back up to the multisite switch.

Thus, the caller communicates with a unit or group in another area via the multisite switch. The call is initially transmitted to the primary site controller, routed through an assigned audio slot in the switch, and retransmitted by the secondary sites on various assigned channels in those other areas. When the call ends, the primary site controller deactivates the assigned channel for that site and notifies the multisite switch 200 that the call is terminated. The multisite switch 200 propagates an end of call command ("channel drop") to all other site controllers. This releases all working channels assigned to the call and breaks the associated audio rating pathways.

In addition to providing communications between mobile radio units in different areas, the multisite switch 200 provides communications between land-line telephone subscribers and radio units as well as dispatchers and mobile radio units. Land-line telephone subscribers can communicate with radio units by dialing an access number as well as a radio unit (or group) identification number which is routed to the trunked communications system through a central telephone interconnect switch (CTIS) and the multisite switch 200. One or more dispatch consoles 202 is connected to the multisite switch 200 in the same manner as the site controllers 102. Both land-line subscribers and dispatch console operators can issue a channel call request through the multisite switch 200 to a site controller 102 to call for example a mobile radio unit.

Each dispatch console 202 may participate in calls in its area. Thus, when a call comes through the multisite switch 200 from another area to a mobile radio, the switch informs the dispatch console 202 of the call in addition to notifying the corresponding site controller 102. The dispatch operator can then listen or participate in the call. The multisite switch 200 also handles calls to groups of mobile units and/or dispatch consoles by ensuring that the site controllers for all of the callees in the group assign a channel to the group call.

The multisite switch 200 has a distributed architecture. The logical functions and computational workload of the multisite switch 200 are shared by various distributed microprocessor "nodes". Each node is connected either to a site controller 102, dispatch console 202, public and/or private landline telephone exchanges and other components of the overall radio system. Most nodes function as interface modules and include, for example, Master Interface Modules (MIMs) for the nodes coupled to site controllers and Console Interface Modules (CIMs) for the nodes coupled to dispatch consoles. Each node is supported by a switch controller card operated by microprocessors. All of the cards have substantially the same hardware and are interchangeable. Each card acts as a gateway interface into the distributed switch network.

Multisite communication networks are often used by agencies and departments, e.g. local police and fire departments, that require a high level of reliability. Public communication networks like cellular telephone networks can tolerate some degree of unreliability in their communications. First, cellular communications typically do not involve a coordinated, multiple party response to public emergencies. Second, if a communication between two parties is interrupted due to interference, faults in the network software or hardware, etc., the usual consequence is that those two parties are inconvenienced. The communication can be reinstated (perhaps after some delay) over the cellular network, or alternatively, over the landline network.

The consequences of such interruptions for police and fire departments over a radio communication network are significantly more dramatic. In responding to emergencies, these departments must have virtually uninterrupted and immediate communications with multiple parties including individual and groups of radio units in various geographical areas as well as one or more dispatchers. Even minor delays in restoring communications after a multisite switch fault could have disastrous effects. In addition, police and other agencies require and very often use secure private RF communications involving digital encryption and decryption. There is no practical way to quickly reinstate a broken switch communication over an alternate network so that multiple parties can communicate securely over a single communications channel.

The functionality of a multisite communications system vitally depends on the control messaging information reaching all nodes in the network. If a bus wire in the control messaging network is frayed or broken, if there is a poor connection of a node to the bus, or if there is a voltage spike over the network causing faulty operation of the control message bus, the multisite switch will not function properly. Accordingly, there is a critical need in multisite communication systems to provide a very reliable control message network.

The present invention provides a system for enhancing the reliability of a trunked RF multisite communication switch connecting plural site controllers, each site controller coordinating RF communications between multiple radio units in corresponding geographical site areas and the switch. Multiple microprocessor-controlled nodes interface communications between corresponding site controllers to the switch. Each node is connected to the switch back plane with a first supervisory node being located at one end of the back plane and a second end node being located at the opposite end.

Multiple bus lines are included in the back plane. A time division multiplex (TDM) audio bus transfers digital audio information between the nodes. First and second control message buses are provided for transferring control messages between nodes. A bus select line is connected to direct each of the nodes to select one of the first and second message buses. A control line connects the supervisory and end nodes, and the end node monitors the logic state of a signal output on that line by the supervisory node.

The supervisory node polls each node over a currently selected message bus. In particular, the supervisory node identifies the end node connected to the current message bus based on the end node's polling response message. If the end node does not respond to the polling message in a predetermined time period, the supervisory node selects the other message bus and changes the logic state of the signal output on the control line. Upon detecting a change in the logic state of the signal over the control line, the end node also selects the alternate bus. Having both selected the alternate bus, the first and second nodes simultaneously coordinate switching of all nodes on both sides of any control bus break to the alternate bus via the bus select line.

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout:

FIG. 1 is a schematic illustration of an exemplary multisite trunked RF communications system;

FIG. 4 is a block diagram illustrating the node data processing and control message bus architecture;

DETAILED DESCRIPTION OF THE DRAWINGS

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so not to obscure the description of the present invention with unnecessary detail.

An exemplary trunked radio repeater system 100 in accordance with the invention is generally depicted and was described above in conjunction with in FIG. 1. In the preferred multisite system 100, for example, the site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller (e.g., via an "inbound" digital control message transmitted over the RF control channel) that an audio working channel is needed. The site controller assigns a working channel to the call and instructs the caller's radio unit to switch from the control channel to the assigned working channel. This assigned working channel is thus ready to support communications within the area covered by the site.

In addition, the site controller sends a message indicating the channel assignment to the multisite network switch 200. The switch 200, in turn, sends a channel request to all other site controllers and routes audio signals such that an audio signal pathway is created between the RF repeater servicing the caller and the RF repeater(s) servicing the callee(s). Additional audio signal pathways may also be established in similar fashion such that one or more dispatch consoles 202 and land-line subscribers may become involved in the communication. Upon receiving a channel request, these "secondary" site controllers may each assign an RF working channel to the call (e.g., if a callee designated by the caller's channel request message happens to be physically located within the coverage area serviced by the associated RF transceiving site). Meanwhile, the switch 200 ensures that the caller's audio has been routed from the active RF receiver of site S1 to active transmitters of each of the other sites participating in the call.

Figure 2:
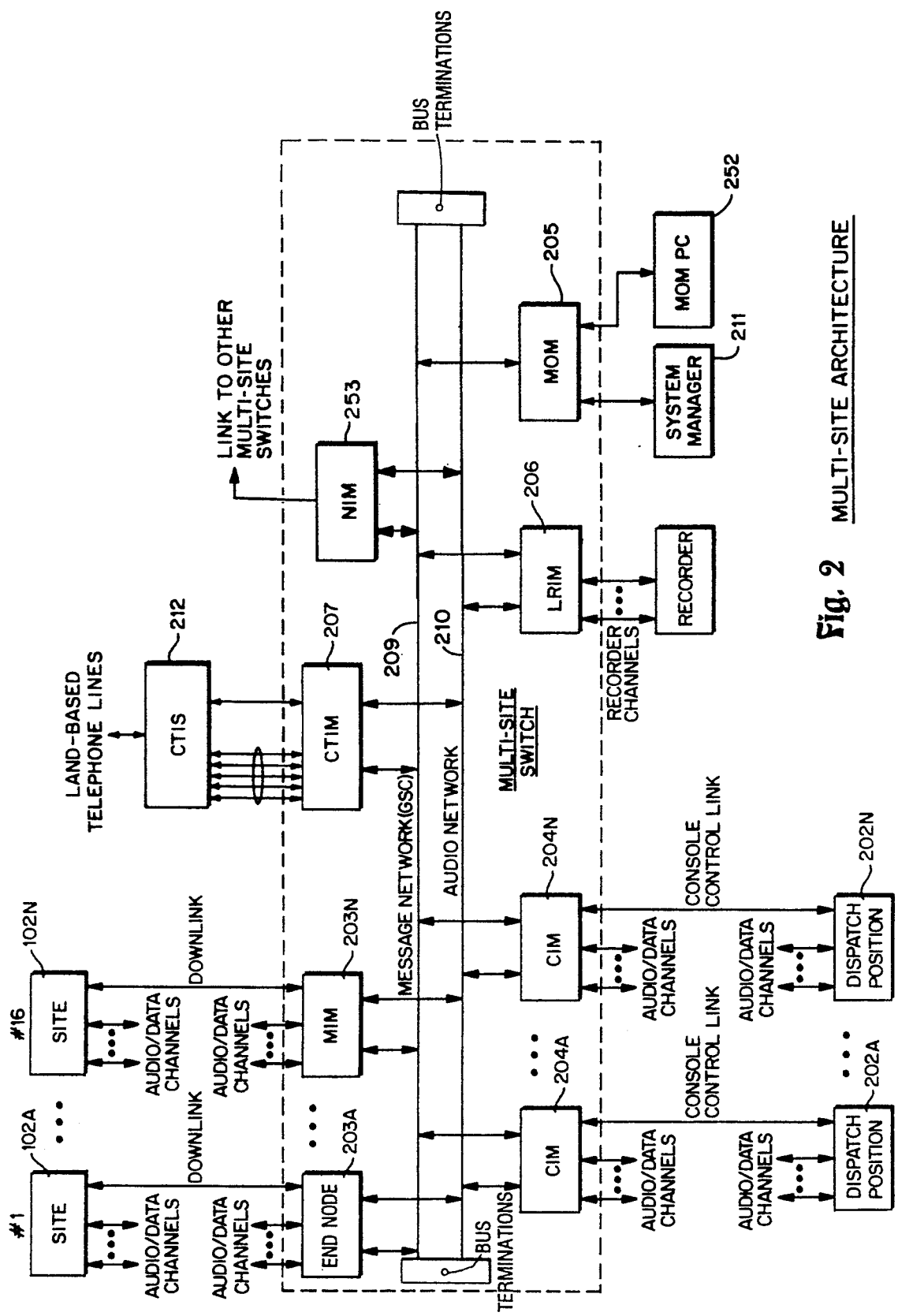
FIG. 2 is a schematic of an exemplary architecture for a distributed, digitally trunked, RF communications multisite switching network.

FIG. 2 is a detailed schematic diagram of the architecture of multisite switch 200 provided by the presently preferred exemplary embodiment of this invention. The multisite switch 200 communicates with each site controller 102 and dispatcher console 202 via data and audio communication lines.

The multisite switch 200 establishes and removes audio connections between sites 102 and dispatch consoles 204 using a local area network of nodes. As shown in FIG. 2, the nodes are labelled corresponding to whether they interface with a site controller, dispatch console, landline telephone switch, other system component, or in the case of the MOM 205 perform some other control function. For example, MIMs 203 are interface modules in the switch that interface with site controllers and CIMs 204 are nodes that interface with dispatch consoles. There are other nodes such as a Monitor Module (MOM) 205, Logging Recorder Interface Module (LRIM) 206, Central Telephone Interconnect Module (CTIM) 207, and Network Interface Module (NIM). The MOM 205 supervises control communications over the control message bus and interfaces the system manager 211 and the MOM PC (personal computer) 252 that have supervisory responsibility for the switch 200 and overall radio communications system.

Each node in the multisite switch is supported by a microprocessor-based controller module. All of the nodes (the MIMs, CIMs, CTIM, MOM, LRIM, and NIM) have the same hardware and are interchangeable. The nodes have different "personalities" to indicate that they are assigned to, for example, a site controller or a dispatch console, etc. Each node can be easily configured to be a MIM, CIM, etc. by setting a few switches.

The nodes of the switch 200 are connected to a control message bus 209 and a digital audio (TDM) network 210. The control message bus 209, shown in FIG. 2, is preferably a message network employing a conventional Global Serial Channel (GSC) digital messaging protocol as implemented using the Intel 80C152 GSC microprocessor. Such a GSC microprocessor is used as the communications controller in the controller module in each node and is essentially dedicated to performing I/O functions for the node. The control message bus 209 is a high speed data bus that interconnects the communication processors in the controller of each node.

The audio bus 210 comprises 32 time division multiplexed (TDM) buses in the preferred embodiment. Each bus contains 32 slots, each slot corresponding to a single audio channel. A maximum of 256 audio slots may be routed through the switch (8 buses $\times$ 32 slots), although some of the slots are used for other purposes (e.g. signalling). In the preferred embodiment, 240 channels of digitized audio are carried by audio TDM network 210.

The MOM 205 is the interface module for the System Manager 211 and the MOM PC (personal computer) 250. The system manager 211 updates databases maintained in all of the nodes. The MOM 205 maintains certain centralized databases including databases for smart calls, confirmed calls, and the active status of every node in the network. Smart calls relate to the operation of the dispatch console 202. A call is "smart"

if the call is selected by the dispatcher via a select speaker in the console 202. A confirmed call is one for which the audio channel and slot assignments must be confirmed before the caller begins talking. A node's status (e.g., active or inactive) is monitored periodically by the MOM 205. Polling messages from the MOM 205 addressing specific blocks of nodes are transmitted over the control message bus 209. Each node monitors the message bus 209 to determine if its address falls in the range currently being addressed. If it is, the node responds to the poll by sending a Node Access Messages (NAM) over the message bus to the MOM 205. The MOM 205 correlates each received NAM with its node to record its active status in the node activity data base.

The LRIM 206 interfaces recorders to the switch assigned to log calls for various groups or units. The CTIM 207 functions much the same as a MIM does with respect to interfacing a site to the switch except that it interfaces to landline telephone lines from the Central Telephone Interconnect Switch (CTIS) 212 to switch 200. NIM 253 interfaces one switch 200 to another multisite switch to provide even greater coverage. Using NIM 253 multiple switches can be connected.

As part of the switch initialization procedure, the nodes connect their assigned TDM bus slots to the node's external channel inputs. For example, a MIM will assign each channel from its site controller to a separate audio TDM bus slot on audio network 210. Once the TDM bus slot is linked to the site channel, the bus slot continuously receives the output from the channel through the host node without further channel setup required. Of course, the site channel has no intelligible signal until it is assigned to a call by the site controller. Although a TDM bus slot is linked to a corresponding site channel, no other nodes (MIM, CIM, etc.) listens to that bus slot until the host node sends a slot assignment message throughout the multisite switch 200 over the message network 209 notifying the nodes that an active call from the site has been assigned to that bus slot.

Figure 3:
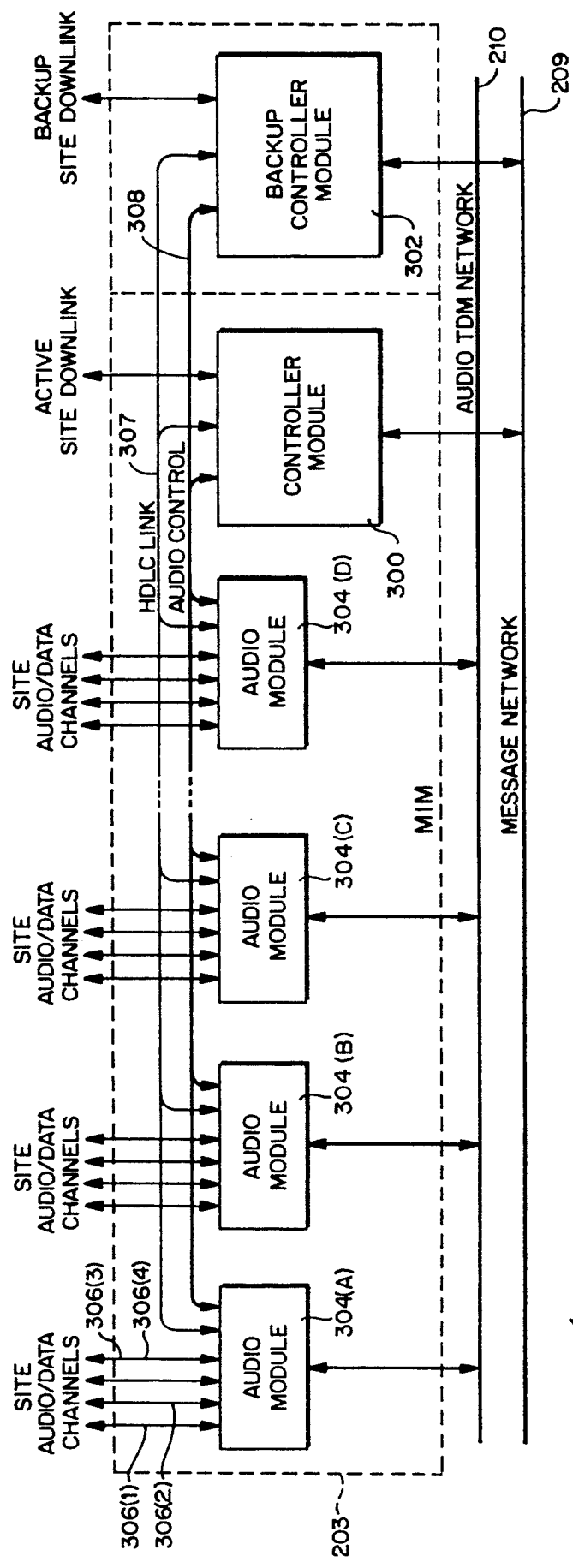
FIG. 3 is a detailed block diagram of a single exemplary node (with multiple audio sources/destinations) shown in FIG. 2.

FIG. 3 is a high level block diagram of a single (multiple audio channel) exemplary MIM 203 provided by the presently preferred exemplary embodiment of this invention. The architecture of other nodes is virtually the same as that for the MIM. As mentioned above, the "highway" used to communicate signals between interface modules includes an audio (TDM) network 210 and a control message network ("GSC") 209. The TDM audio bus simply transfers whatever digital information is placed on the TDM bus slot. MIM 203 typically services multiple RF channels providing multiple audio source/destinations each of which are connected independently to a TDM bus slot.

MIM 203 includes a node controller module 300, a backup controller module 302, and plural (preferably eight) audio modules 304 (only four are shown for purposes of illustration). Each audio module 304 in the preferred embodiment is connected to a maximum of four RF repeaters of an RF trunking site, or in the case of a CIM and a CTIM (for console and landline communications) to four bidirectional audio links. For example, audio module 304(A) includes bidirectional audio links 306(1)–306(4) serving associated first through fourth trunked RF repeater site "channels"(i.e., RF transceiving/repeating decks associated with particular trunked RF channels). The audio modules 304 act as source gateways ("entrance/exit ramps") which convert analog audio signals generated by MODEMs from the trunked repeater sites into digitized audio signals (PCM) and place the digitized audio signals onto the audio TDM network 210. These same audio modules 304 act as audio destinations by taking selected signals from the audio TDM network 210, converting them from digital into analog form, and providing the resulting analog signals to the RF repeater site "channels" for transmission via RF links.

The node controller module 300 communicates with each of the four audio modules 304 via a common HDLC link 307 and an audio control link 308. The HDLC link 307 is used, for example, to carry fault indications and messages relating to RF "channel" status between the audio modules 304 and the node controller module 300. Audio control link 308 permits the controller module node 300 to set channel parameters (e.g., level adjustment, TDM slot assignment, etc.) within each audio module 304.

FIG. 4 shows a block diagram of an exemplary architecture for node controller 300. Each controller node 300 includes an I/O communications controller 310, a dual-port random-access-memory (RAM) 312 and an interface processor 314. The communications controller 310 routes and receives control messages between the control message bus 209 and the interface processor 314. The dual-port RAM 312 is used to communicate between the communications controller and the interface controller 314. The communications controller 310 may be an Intel 80C152GSC microprocessor. Messages received from the site controller 102 over the serial port 316 are translated into a format usable by the multisite switch. The communications controller 310 also translates switch messages into a format that the site controller or console understands.

The interface processor 314 performs substantially all the logical functions for the nodes and is effectively the "intelligence" of the MIM 203. Interface processor 314 (which may be an Intel 80C186 microprocessor) initially assigns TDM bus slots channels to the individual RF transceivers associated with audio links 306(1)–306(4) of audio modules 304 using parallel audio control bus 308. The interface processor 314 connects audio slots to the RF channels, dispatcher console, or CTIS to establish a communications link for a call and also terminates that link when a call ends. As previously described, each MIM is preassigned a set of TDM bus slots for outputting audio signals onto the TDM bus, and these slots are not assigned and de-assigned during the course of normal call routing.

Each call through the switch is patched from its assigned TDM bus slot on the audio bus 209. Since the interface controller 314 for each node assigns slots, connects audio slots to the site controller or dispatch console to establish a communications link, and terminates calls, the nodes must continually inform each other of their slot assignments when a call involving that slot becomes active. Accordingly, the nodes send control messages regarding slot assignments, slot updates and slot idles over the control message network 209 to other nodes.

The I/O communications controller 310 for each node initially processes all of the messages on the GSC message network 209. Slot assignments are forwarded to the interface processor 314 through the dual-port RAM 312. The I/O communications controller 310 processes slot update and slot idle messages by referring to a slot bit "map" or database located and maintained in the dual-port RAM 312 for all TDM bus slots on the audio bus 210. By referring to the slot bit map, the communications controller 310 determines whether the slot status message conveys information already known, or if the slot status message conveys new information about a TDM bus slot. Update messages are sent regularly by the nodes hosting calls to confirm to the other nodes the active status of a slot. When a host terminates a call, it sends a slot idle message to the other nodes and also periodically resends idle messages until the slot is involved in another call. Thus, all nodes are continually informed of the status of all TDM bus slots that have been assigned at least once. A more detailed description of the slot bit map and slot status messages is provided in U.S. Pat. No. 5,253,253 entitled "Message Bus Slot Update/Idle Control and RF Trunking Multisite Switch" which is incorporated herein by reference.

Each MIM is coupled to its site controller through a standard serial telephone line or other transmission media. MIMs receive digital command signals from their site controllers 102 through a downlink line as is described in commonly assigned U.S. Pat. No. 4,835,731, entitled "Processor-To-Processor Communications Protocol For A Public Service Trunking System" also incorporated by reference.

Each MIM also maintains a radio unit database that identifies the radio units within its site and the groups that correspond to active calls. These databases are set up by the system manager 211 and sent to all interface modules. The radio unit database identifies each mobile radio unit in the wide area system. For each MIM, some of the mobile units will be in its assigned site area and others will be outside of its area. Each MIM keeps track of which units are in its area and which group(s) is currently selected by the unit. Since each mobile unit may be capable of participating in several different groups, the mobile unit operator selects the desired group at any particular time. Whenever a call comes in for the selected group, then the unit will receive the call.

The MIMs also maintain a group database. A group is a collection of units that communicate together on a single call. For example, there may be a group for the fire department that allows all of the fire trucks to listen to the central dispatcher or the fire chief. The dispatcher programs this group into his console to broadcast messages to all fire trucks. Similarly, groups can be established for rescue stations, police units assigned to a particular precinct, and many other combinations of users of the public service radio system.

The procedures followed by the multisite switch 200 in activating a call from a radio unit and from a dispatcher console, confirming receipt of the call request, and terminating the call are now described.

A "primary" MIM receives a radio unit originated channel assignment from its corresponding site controller. This signal indicates that a mobile unit in the area assigned to that MIM wants to call another unit or a group and its site controller has assigned a channel to the call for its area. The MIMs assigned to callees are "secondary" MIMs. The channel assignment is sent to the multisite switch as described above and received in the MIM by the communications controller 310 as are all communications from outside of the multisite switch. The MIM translates the site channel assignment into a TDM bus slot assignment for use within the multisite switch and that the slot assignment is sent to all other interface modules and components. The primary MIM logs that TDM bus Slot (i.e. channel) as active and the MIM performs an updating task sending slot update messages to the other interface modules.

More specifically, the MIM responds to the radio originated TDM bus slot assignment by sending messages on the multisite switch message bus 200. A TDM slot assignment message is sent to all switch components identifying the TDM bus slot on the audio bus 210 that is assigned to the call. Upon receipt of the slot assignment message, each CIM 204 looks through its database to determine if the callee is programmed at its corresponding console 202. If the callee is programmed and the channel assignment message indicates that the audio is not encrypted, the CIM 204 connects its corresponding dispatch console 202 to the audio slot for the call. In this way, the dispatch console can monitor all unencrypted calls involving groups or units that have been programmed by the dispatcher. The MOM 205 sets up group calls, informs CIMs of smart calls, and tracks which calls have been "selected" by a dispatch console. The secondary MIMs receive a TDM bus slot assignment and a slot update from the primary MIM. Each MIM checks its unit database to determine whether the callee(s) is listed as being in its area. If the callee(s) is not in its area, then the MIM does nothing. If there is a callee(s) in its area, the MIM is designated as a secondary MIM and sets the assigned TDM bus slot bit (or clears the bit if the slot assignment says the channel is dropped) on the bit map maintained in its RAM 312 to stop subsequent updates from being sent to the interface processor 314.

A detailed description of the messaging and protocols involved in the call setup and takedown procedures is provided in commonly assigned U.S. Pat. No. 5,200,954 entitled "Communication Link Between Multisite RF Trunked Network and an Intelligent Dispatcher Console," the disclosure of which is incorporated herein by reference. Detailed description of the audio modules 400 and there operation is set forth in commonly assigned U.S. patent application Ser. No. 07/658,636 entitled "Audio Routing Within Trunked Radio Frequency Multisite Switch" filed on Feb. 22, 1991 and incorporated herein by reference.

Figure 5:
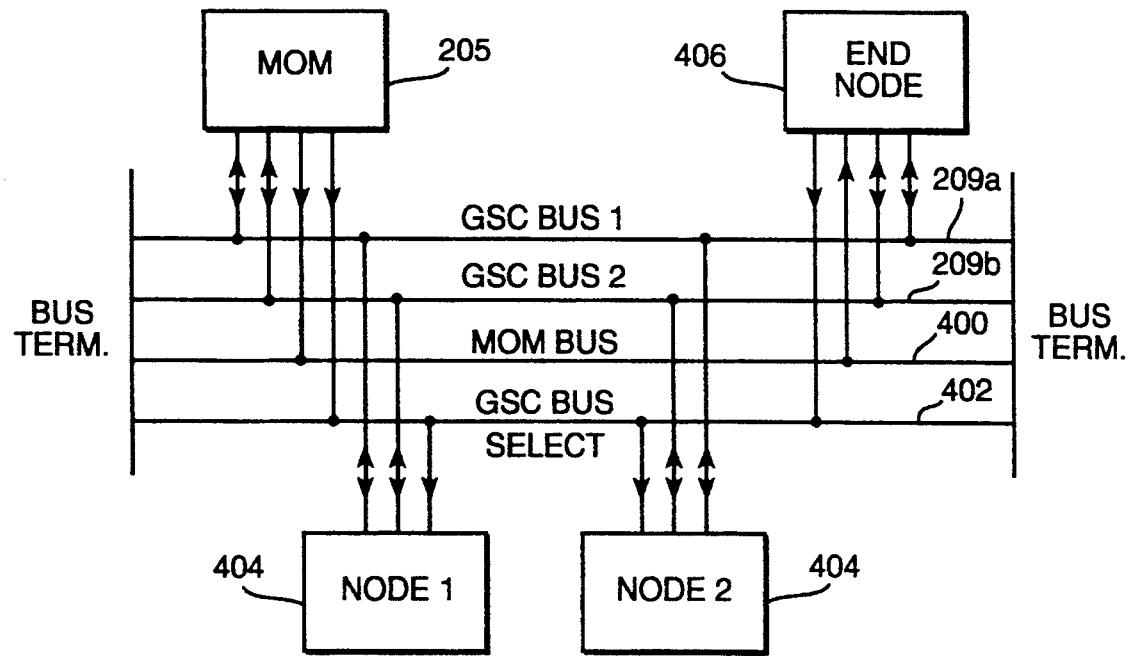
FIG. 5 is a block diagram showing the various control buses employed in the control messaging network of the multisite switch.

Each node is essentially a circuit card or board which is physically inserted into a centralized interconnect terminal which includes a back plane having all of the necessary hardware connections between the nodes, e.g. power, data, and control buses. Each node has a unique node identification number that may be dynamically assigned. In addition, DIP switches on each node card can be manually set to indicate whether that node is an "end node" as described below. FIG. 5 symbolically represents the configuration of nodes connected to the back plane. Two GSC message buses 209a and 209b are bidirectionally connected to each node. In the preferred embodiment, the nodes are configured such that MOM 205 is inserted at one end of the back plane at one bus termination (e.g. the left end in FIG. 5), and an end node 406 is connected to the opposite end of the back plane (e.g. the right end in FIG. 5). Between MOM 205 and end node 406, the remaining nodes represented by nodes 1, 2, etc. (404) are bidirectionally hardwire-connected to the GSC buses 209a and 209b. All of the nodes including MOM 205 and end node 406 are also connected to a GSC bus select line 402 used to coordinate uniform node switching from one GSC control message bus to the other.

A single hardwire line identified as MOM bus 400 is included in the back plane and directly connects MOM 205 to end node 406. End node 406 monitors the logic state of a signal output by MOM 205 on MOM bus 400. Whenever end node 406 detects a change in the logic state on MOM bus 400, it is programmed to automatically select the alternate GSC control message bus by changing the state of the GSC select line. A change of the logic state on the GSC bus select line effected by either the MOM 205 or the end node 406 is transmitted across the back plane so that all other nodes simultaneously switch to the correct alternate GSC control message bus.

If there is a hardwire break or disconnection in the current GSC bus or if there is also a break in the GSC bus select line, the MOM bus 400 insures that the MOM 205 and end node 406 are both informed of the break to coordinate uniform switching to the alternate message bus by all nodes in the network. In the exemplary configuration shown in FIG. 5, if there is a break in the current GSC bus or the GSC bus select line, all nodes to the left of the break are instructed by MOM 205 to select the alternate message bus, and all nodes to the right of the break are instructed by end node 406 to select the alternate control message bus. Inserting the MOM 205 at one end of the multisite switch control message bus and the end node 406 at the other end allows detection of control message bus breaks or faults anywhere along the bus. Obviously, the MOM 205 and end node 406 could be placed at other locations along the back plane, but this would reduce the overall reliability of a control message network. All nodes transmit GSC data on both GSC buses simultaneously, and the GSC bus select line selects the current bus.

The MOM 205 continuously periodically sends out polling messages over the GSC control message buses. Each node monitors these polling messages and responds to a corresponding polling message with an appropriate node active message (NAM). The MOM 205 analyzes these node active messages and updates a node status data base that it maintains. It also searches for a NAM having an end node identification which is determined in part by the manually set DIP switches on the end node card. If MOM 205 fails to receive an NAM from end node 406 during a predetermined period, the most probable cause is failure of the currently selected control message bus.

In the preferred embodiment, MOM 205 uses a software timer to establish the time period during which it expects to receive a NAM from end node 406. The timer is reset every time a NAM is received from the end node 406. If the software timer expires before receiving the end node NAM message, the MOM 205 transmits a system error message to MOM PC 252 and then instructs the MOM I/O communications controller 310 to select the alternate GSC messaging bus by changing the state of the GSC bus select line 402. At the same time, the MOM I/O communications controller 310 changes the logic state of the MOM bus 400 which is continuously monitored by end node 406. When the end node 406 detects this logic state change on MOM bus 400, the I/O controller 310 of the end node 406 also selects the alternate GSC messaging bus by changing the logic state of GSC bus select line 402. When either the MOM 205 or end node 406 change the state of the GSC bus select line 402, a GSC bus select change command is communicated across the back plane to every other node so that all nodes simultaneously switch to the correct messaging bus. All other nodes monitor the GSC bus select line for changes in state. If the state of the GSC bus select line does not match the currently selected bus, then each node switches GSC buses.

If the end node 406 malfunctions or for some reason is not present in the system, it fails to respond in time to the polling message. The MOM 205 interprets the poll response failure as a GSC messaging bus break and directs all nodes in the system to switch GSC buses. In order that this bus switching operation does not occur indefinitely, MOM 205 permits only a maximum number of GSC message bus switches to occur, e.g. two. After two bus switches without receiving an end node NAM, an error message is sent to the MOM PC 252.

Simplified function block diagrams of the MOM 205, end node 406 and node #1 404 will now be described in conjunction with FIGS. 6–8. Each node illustrated in FIGS. 6–8 includes an I/O communications controller 310 and a GSC messaging bus select switch 408. In MOM 205, I/O controller 310 continuously outputs a signal having predetermined logic state (e.g., either a logic 1 or a logic 0) over MOM bus 400. MOM I/O controller 310 also outputs a GSC bus select signal 402 which controls bus switch 408 to select one of GSC Bus 1 (209a) and GSC Bus 2 (209b). Depending upon the logic state applied to GSC select bus line 402, either of these two buses is connected through switch 408 to I/O controller 310 as the current GSC bus to receive data.

Figure 6:
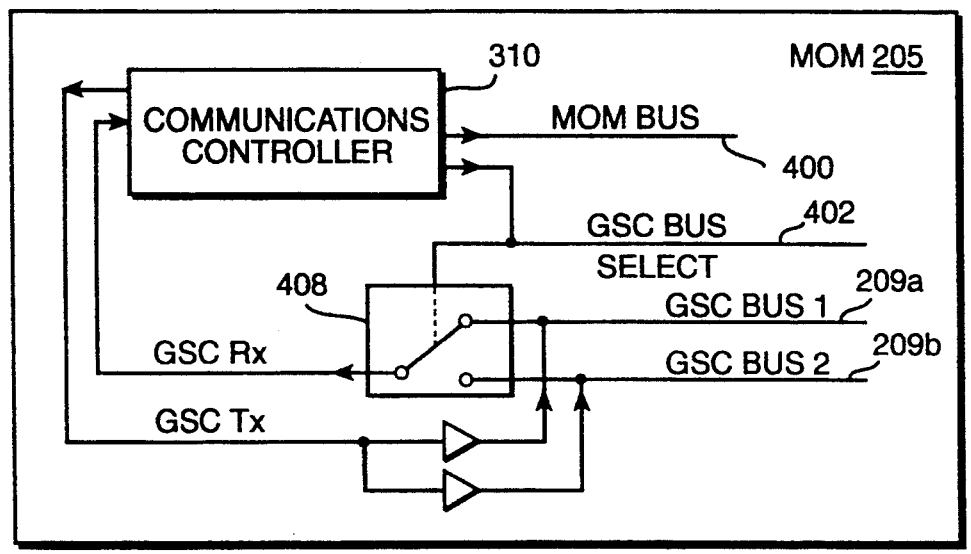
FIG. 6 is a simplified function block diagram of the MOM 205.
Figure 7:
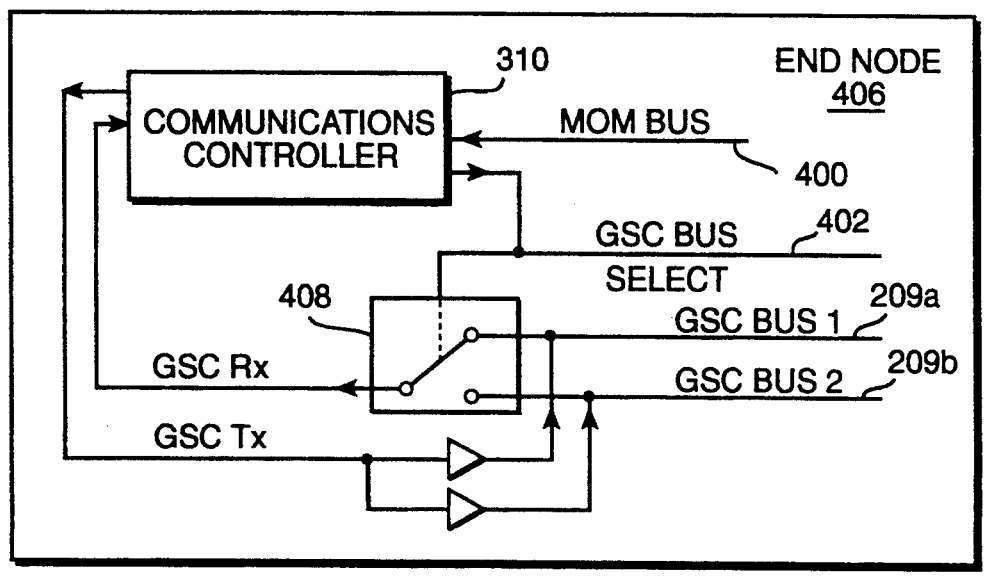
FIG. 7 is a simplified function block diagram of the end node.
Figure 8:
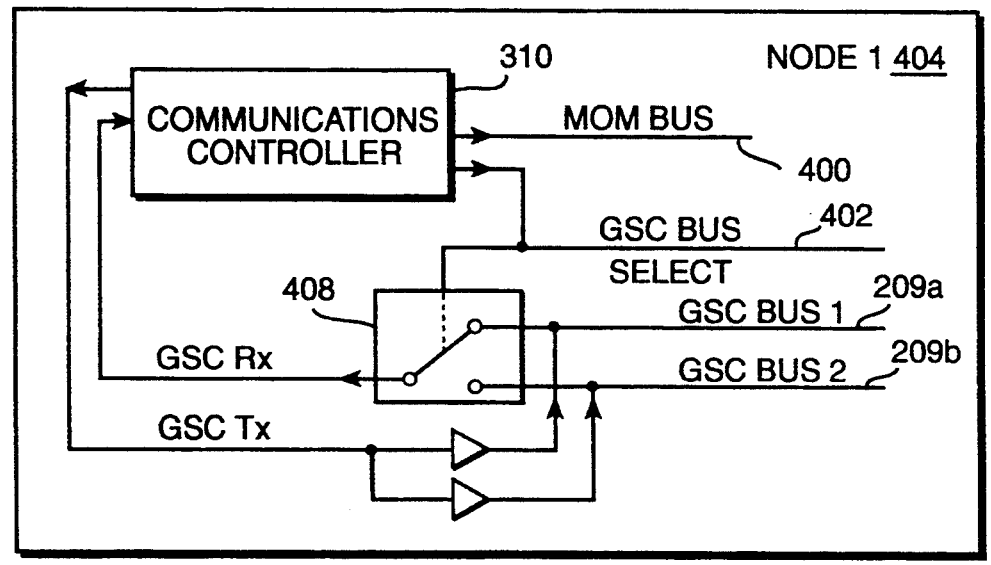
FIG. 8 is a simplified function block diagram of a generic node X.

End node 406 shown in FIG. 7 is configured the same as MOM 205 in FIG. 6 except that it monitors the logic state of the MOM bus 400 to determine whether the logic state has changed based on the output signal generated by the MOM 205. Node #1 404 shown in FIG. 8 is representative of all of the nodes between the MOM 205 and the end node 406. Node #1 is configured like the end node 406 except that it lacks a connection to the MOM bus 400, and its I/O controller 310 has no independent connection to or control of the GSC bus select line 402. Only the MOM 205 and end node 406 can control the logic state of the GSC bus select line 402. Since all nodes have the same hardware connections, software and/or the DIP switch settings determine the functionality of each node.

If a break is detected in GSC Bus 1, the nodes are commanded to switch buses by the MOM 205 and/or end node 406. If a secondary failure occurs resulting in a break in the GSC bus select line, the MOM 205 and the end node 406 insure that all nodes receive the command to switch GSC data buses. The present invention accomplishes the bus switch using simple hardware (bus switch 408) and signalling (GSC Bus Select 402). Despite a break in the current GSC Bus, the end node 406 and MOM 205 may still communicate over MOM bus 400.

Operational procedures executed by the various nodes in the multisite switch for implementing the present invention will now be described in conjunction with the flow chart diagrams illustrated in FIGS. 9–15.

Figure 9:
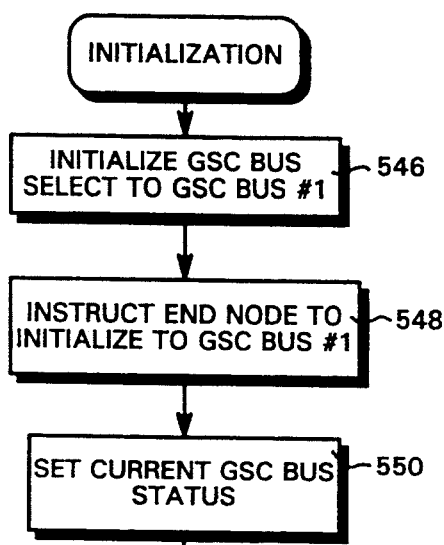
FIGS. 9–15 are flow chart diagrams illustrating the procedures followed by various node controllers in the multisite switch in implementing the present invention.

FIG. 9 illustrates procedures used to initialize the MOM I/O communications controller 10, e.g. during power up reset. In block 546, GSC Bus 1 (209a) is initially selected; however, GSC Bus 2 could also be selected for compatibility reasons. The end node 406 is instructed by the MOM I/O controller 310 to initialize its GSC bus select output to GSC Bus 1 (block 548). The MOM I/O controller then sets the current GSC bus status in its node activity data base to reflect that GSC Bus 1 is currently selected (block 550).

Figure 10:
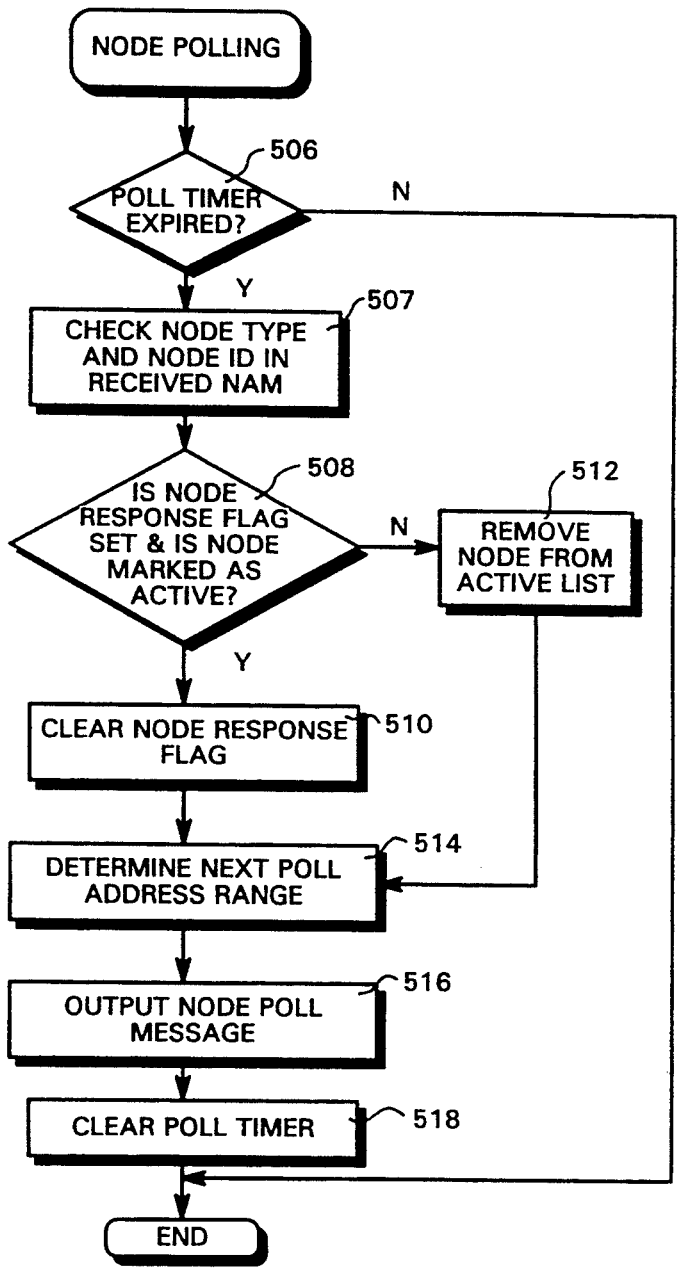

FIG. 10 illustrates the node polling procedures followed by the MOM interface controller 314. The flow chart assumes that polling has been initiated. In decision block 506, the MOM interface controller 314 checks a polling timer to see if it has expired. The polling timer is used to limit the processing time of MOM controller 314 devoted to node polling procedures. If it has expired, control moves on to another task until the next poll is to be taken. If it has not expired, the MOM checks received NAM responses for node type (CIM, MIM, etc.) and identification (or address) in block 507. When an active node returns a NAM poll response, MOM controller 314 sets a corresponding node response flag in its node activity data base. In decision block 508, the MOM determines whether the node response flag has been set and whether the node corresponding to a received NAM is active. If the node response flag has not been set or the node is inactive, that node is removed from the MOM's active node database list in block 512. Since all connected nodes should be active, inactivity indicates erroneous operation of that node or its removal from the back plane. If the flag has been set indicating that a normal polling response (i.e. a NAM) was received for that node, the node response flag is reset in block 510, and control proceeds to block 514 where the next polling address range is determined (i.e., the group of nodes to be polled next) for the next MOM polling operation. Subsequently, a node polling message for the most recently determined polling address range is output over the GSC messaging bus 209 to all of the nodes, and the poll timer is reset (block 518) to monitor the current polling time period.

Figure 11:
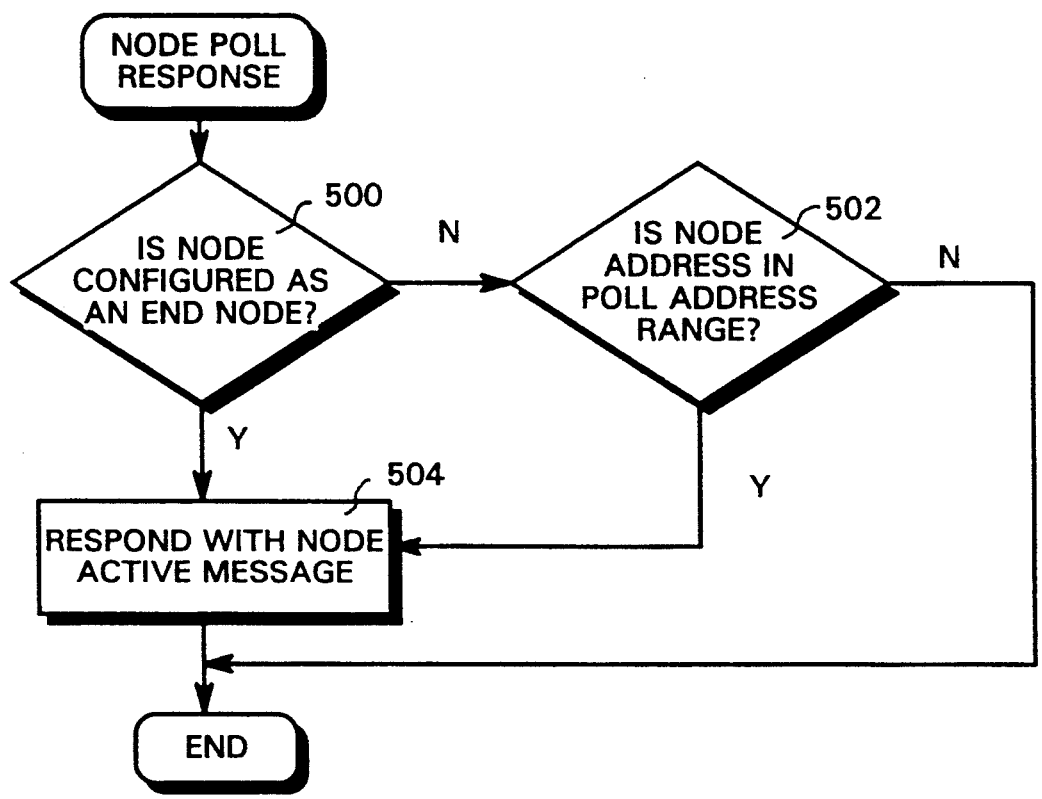

FIG. 11 is a flow chart diagram outlining the response of each node to polling messages generated by the MOM interface controller 314. Initially, each node determines whether it is configured as an end node (block 500) based on predefined DIP switch settings of the node card. If the node's DIP switch settings configure it as an end node, it responds to the MOM polling message with a node active message (NAM) indicating that it is an end node 406 (block 504). If the node is not configured as an end node, the node compares its node address with the address range of the polling message sent from MOM 205 (block 502). If its address is in range, it responds with an active node message (block 504); otherwise, no response is made.

Figure 12:
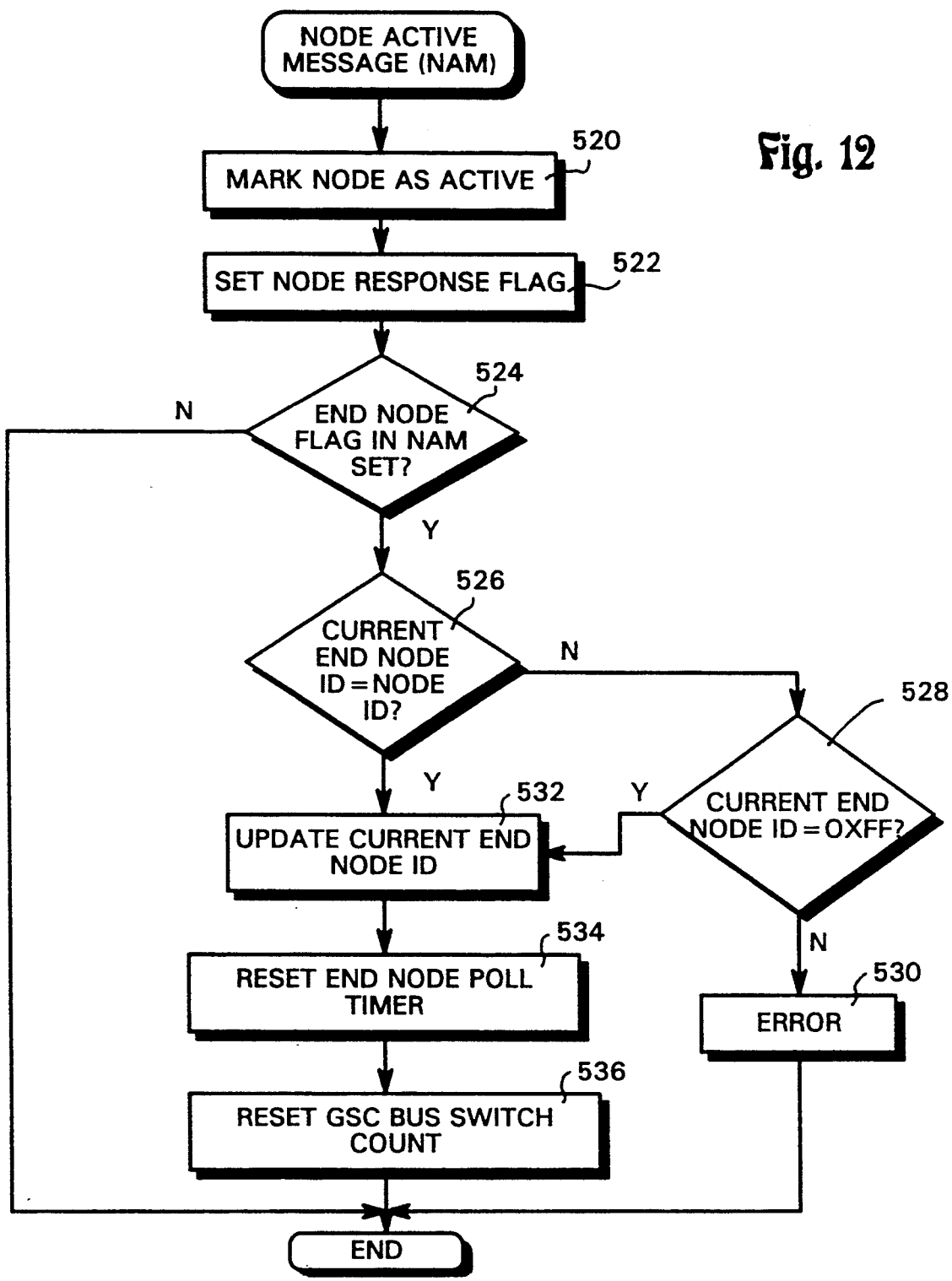

FIG. 12 shows the procedures followed by the MOM interface controller 314 in response to node active messages (NAM) received from polled nodes in the switch. Upon receiving a node active message from a particular node, MOM interface controller 314 marks the responding node as active (block 520), thereby updating the node activity database stored in MOM interface controller 314, and sets a node response flag referred to in step 508 of FIG. 10 (block 522). In decision block 524, the MOM interface controller 314 determines whether in this node response (i.e. NAM) an end node flag has been set. If the flag is set, this usually means the end node 406 has responded, and a decision is made in block 526 whether the currently addressed node ID equals the end node ID. Normally, if the end node flag is set, the currently addressed and end node IDs are the same, and the current end node ID is updated in the MOM in block 532. If both the current and end node IDs are not the same, e.g. as occurs during initialization, a determination is made in block 528 whether the current node ID equals an initial node identification OXFF which the MOM assigns temporarily as the end node ID during power up. If the current end node address does not equal OXFF, an error message is generated in block 530. Otherwise, the end node ID is updated to equal the currently assigned node address of the end node 406 (after initialization). Control then proceeds to block 534 which resets an end node poll timer monitored by the MOM 205 because the end node 406 responded before the end node timer expired. The end node poll timer defines the period of time during which the MOM waits for an end node poll response before switching to an alternate GSC message bus. Thereafter, the GSC bus switch count, i.e., the number of times the GSC buses have been switched (up to a maximum of two times) is reset in block 536. Thus, two GSC message bus switches are permitted after an end node poll response failure is detected. If the end node 406 responds before the bus switch count reaches two, the bus switch counter is reset to zero. When the count reaches two, no further bus switches are allowed and the systems is assumed to have failed. Obviously, if the switch includes more than two messaging buses, more than two bus switches would be permitted.

Figure 13:
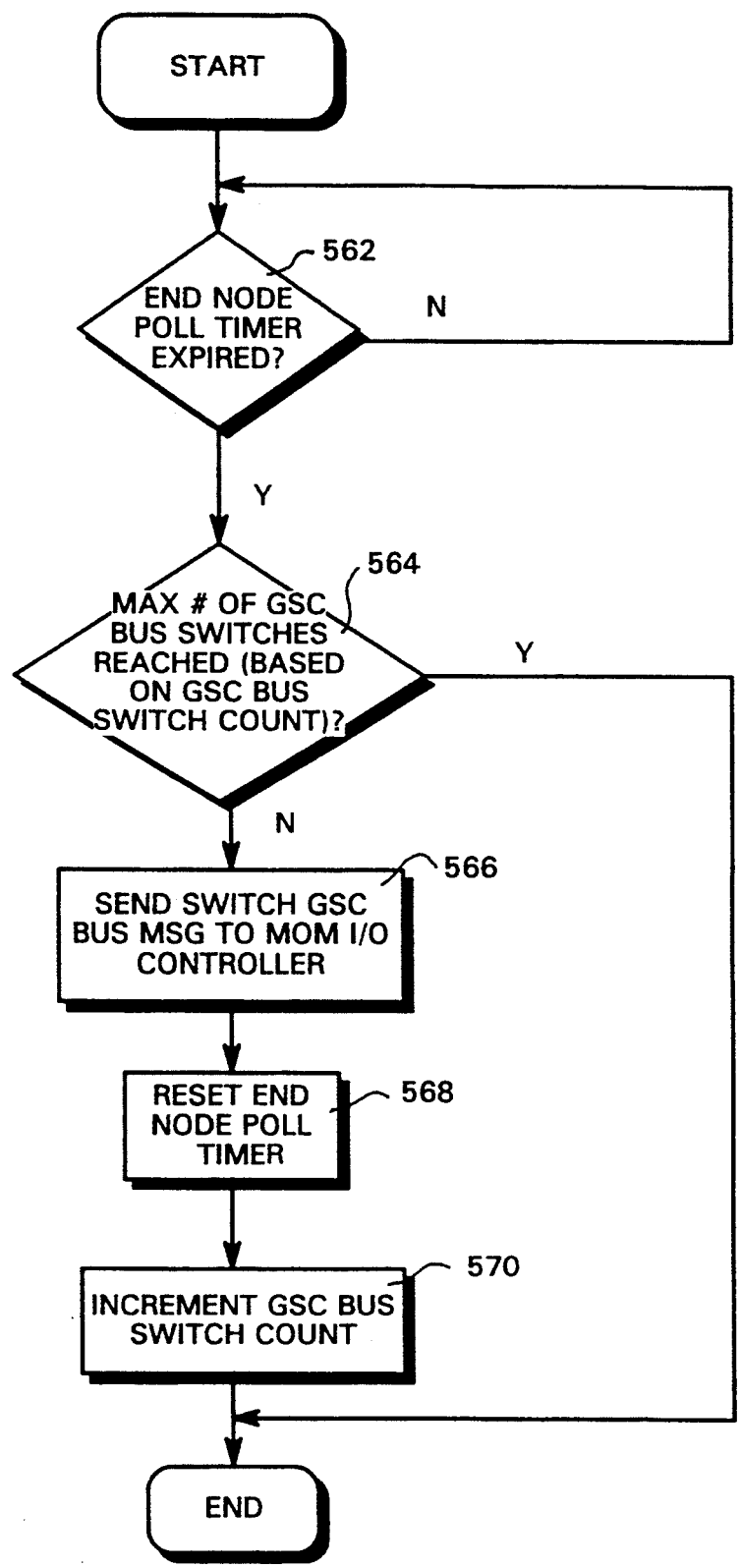

FIG. 13 outlines the procedures performed by MOM interface controller 314 in monitoring the status of end node poll responses. In block 562, a decision is made whether the end node poll timer has expired. If it has expired, control proceeds to block 564 where a decision is made to determine if the maximum number of GSC message bus switches has been reached after the end node timer times out, e.g. 2. If it has, control exits from this procedure. If not, a GSC bus switching message is transmitted to MOM I/O controller 310 which then changes the logic state of the GSC bus select line 402 and MOM bus 400 to effect the GSC messaging bus switching operation. Thereafter, the end node timer is reset in step 568 and the GSC bus switch count is incremented in block 570.

Figure 14:
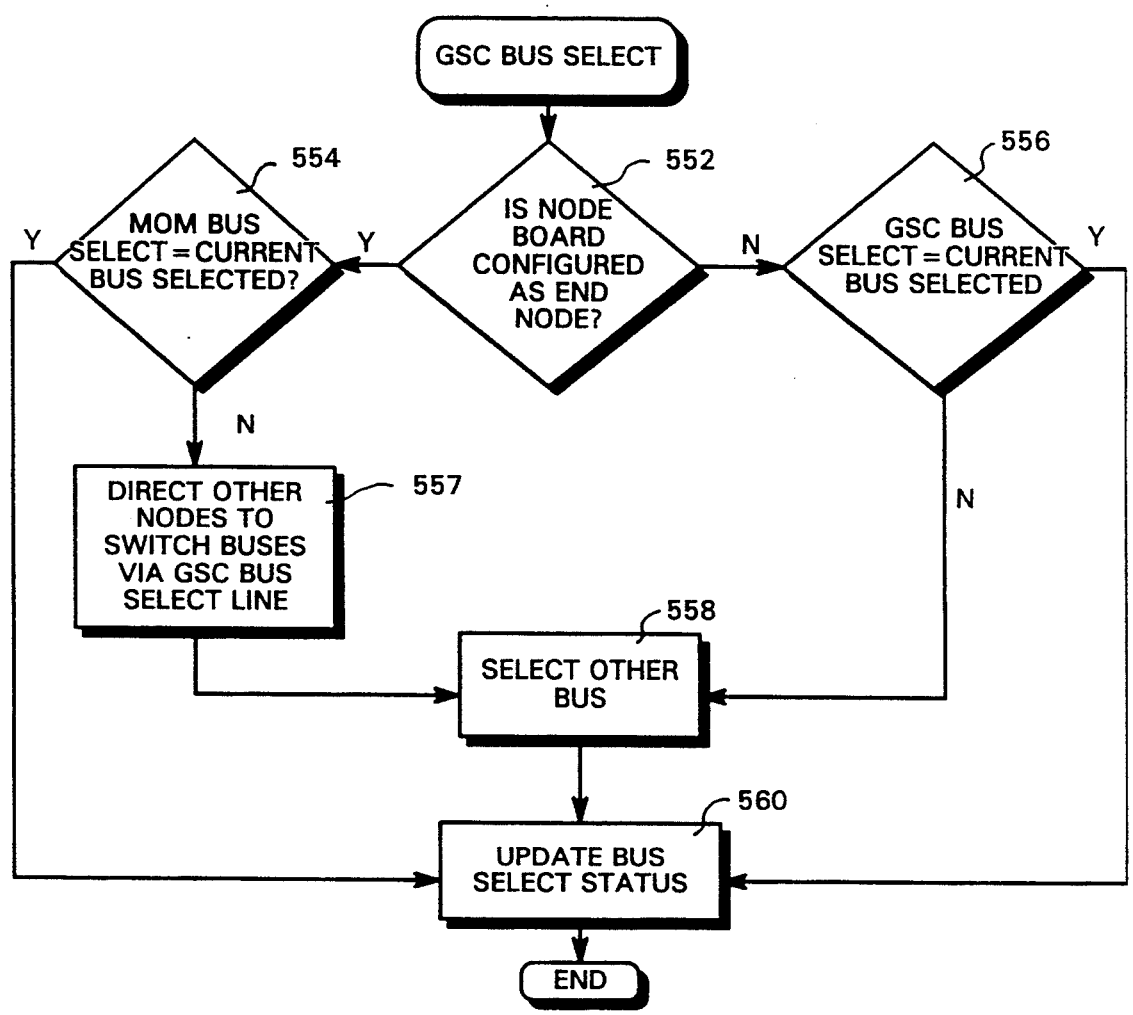

FIG. 14 illustrates GSC message bus selection procedures followed by the I/O communication controllers of all other nodes other than that in MOM 205. In block 552, the decision is made whether this node board is configured as an end node, i.e. this configuration may be determined by manually preset DIP switches on the board. If it is, control proceeds to decision block 554 where it is determined whether the GSC bus select signal generated by the MOM is the same as the currently selected GSC bus. If it is not, the nodes are directed to select another GSC bus over the GSC bus select line 402 (block 557). If the node is not configured as an end node, a decision is made in block 556 whether the GSC bus select command over GSC bus select line 402 corresponds the GSC bus currently selected by this node. If it is not, the other GSC bus is selected (block 558). After each of the GSC bus related operations is completed, the GSC bus select status is updated (block 560).

Figure 15:
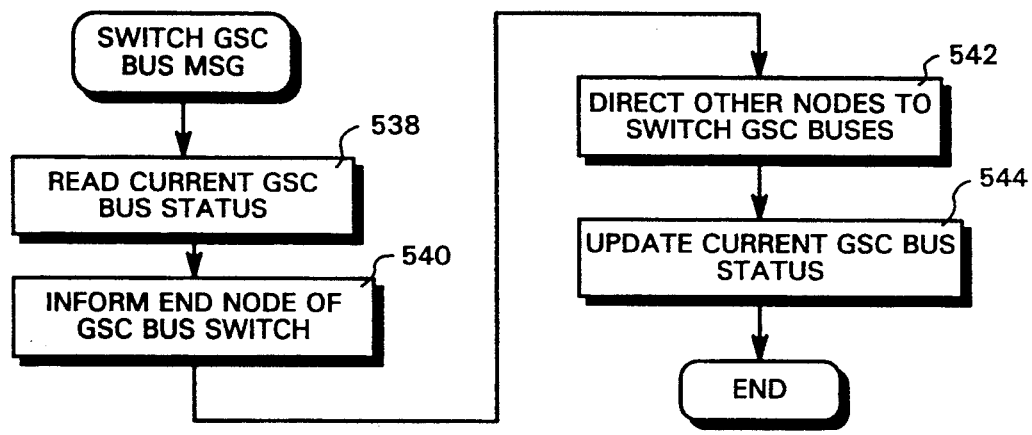

FIG. 15 illustrates procedures followed by the MOM I/O communications controller 310 during power-up reset when MOM interface controller 314 determines a GSC bus switch is necessary. In block 538, the currently selected GSC messaging bus is determined. The end node 406 is then commanded to switch from the current GSC bus to an alternate GSC bus in block 540 via MOM bus 400. All other nodes are directed to switch GSC buses via commands from the MOM and end node on GSC bus select line 402 in block 542. Thereafter, the currently selected GSC bus status is updated and stored in the appropriate MOM database in block 544.

The present invention insures very reliable control messaging operations between the switch nodes thereby permitting continued trunked RF communications over multisite switch despite breaks or faults in a current control messaging bus. By monitoring the occurrence of an end node polling response within a predetermined polling time period, the present invention readily detects faults in the messaging bus and immediately switches to an alternate control bus to avoid what would otherwise be a potentially disastrous system failure in conventional multisite communications systems. The MOM bus 400 allows the MOM 205 (after having determined the need for bus switching) to synchronize with end node 406 to switch all nodes to the alternate messaging bus. Both the MOM 205 and end node 406 thereafter output a GSC switching signal over the GSC select line 402 to all nodes on both sides of any break in the current GSC bus at substantially the same time.

While particular embodiments of the present invention have been described and illustrated, it should be understood that the present invention is not limited thereto since modifications may be made by persons skilled in the art. For example, while the present invention has been described with two GSC messaging buses, more than two messaging buses could be provided and individually selected to increase system reliability. The present invention contemplates any and all modifications and equivalents that fall within the spirit and scope of the underlying invention disclosed and claimed herein.

What is claimed is:

1. A system for enhancing the reliability of a trunked radio frequency (RF) multisite communications switch connecting plural site controllers, each site controller coordinating RF communications between multiple radio units in corresponding geographical site areas and the switch, the switch comprising:
   multiple microprocessor-controlled nodes for interfacing communications between corresponding site controllers to the switch;
   a back plane connected to each of the nodes with a first one of the nodes connected at one end of the back plane and a second one of the nodes connected at the opposite end, including:
      a time division multiplex (TDM) audio bus for transferring digital audio information between various site controllers via corresponding nodes;
      plural control message buses for transferring control messages between the nodes; and
      a bus control line connected across the back plane to each node for directing each of the nodes to select one of the plural message buses,
   wherein the first node polls each node over the selected message bus and includes means for detecting absence of a predetermined polling response from the second node and thereafter commanding all of the nodes to select another of the plural buses.

2. The switch according to claim 1, the first node further comprising:
   means for identifying that the second node is configured as an end node connected at the other end of the back plane.

3. The switch according to claim 1, wherein the means for commanding generates a change control bus signal over the bus control line.

4. The switch according to claim 1, the first node further comprising:
   a timer for monitoring the period of time during which the second node should respond to a polling message from the first node, wherein the first node detects the absence of the second node polling response when the timer expires.

5. The switch according to claim 1, further comprising:
   another control line across the back plane connected to the first and second nodes, wherein the second node upon detecting a change in the signal status over the another control line, automatically selects another of the plural control message buses and generates a bus switching command over the bus control line.

6. The switch according to claim 5, wherein the first node changes the state of a signal output on said another control line when the absence of the predetermined polling response from the second node is detected.

7. The switch according to claim 1, further comprising:
   means for limiting the number of times the nodes select another message bus.

8. The switch according to claim 1, wherein each node is assigned an address identifier and sends that identifier to the first node in response to polling.

9. The switch according to claim 1, wherein the first node is a controller node including:
   a timer;
   means for checking each node's polling response to determine if it is the second node; and
   means for resetting the timer when the polling response is received from the second node during a predetermined time period.

10. A method for detecting a break in a message bus connecting plural microprocessor-controlled nodes connected via first and second message buses in a trunked radio frequency multisite communications network, comprising:
   (a) connecting each of the nodes to a back plane which includes the message buses and a first control line;
   (b) providing a control node at one end of the back plane;
   (c) providing an end node at the other end of the back plane;
   (d) the control node periodically polling the other nodes;
   (e) detecting an absence of a polling response from the end node;
   (f) in the absence of the end node polling response, changing the state of the first control line;
   (g) the end node detecting the change of state of the first control line and generating a bus switching control signal in response thereto; and
   (h) in response to a bus switching control signal from one of the control node and the end node, all of the nodes switching substantially simultaneously from the first bus to the second bus.

11. The method according to claim 10, further comprising:
   switching back to the first bus upon detecting continued absence of the polling response from the end node, and
   thereafter prohibiting further message bus switching.

12. The method according to claim 10, wherein the absence of the polling response from the end node is communicated to a switch supervisor.

13. The method according to claim 10, step (f) further comprising:

changing the state of a second control line in the absence of the end node polling response, and step (g) further comprises the end node detecting the change in state of the second control line and generating a bus switching control signal in response thereto.

14. A switch, comprising:

a back plane including plural control message buses and a control line;

multiple, processor-controlled nodes operatively connected to one of the control message buses and to a control line of the back plane, wherein when one end node polls other nodes on one of the control message buses and detects that a response is not received from the other end node, the one end node commands all of the other nodes over the control line to switch to another control message bus.

15. A method comprising the steps of:
(a) connecting multiple nodes to plural control message buses and a control line of a back plane;
(b) one end node polling the other nodes on one of the control message buses;
(c) detecting when a response to the polling step (b) is not received from the other end node;
(d) in response to the detecting step (c), the one end node commanding all the other nodes over the control line to switch to another control message bus.

* * * * *